United States Patent [19]

Pryor et al.

[11] 4,102,460

[45] Jul. 25, 1978

[54] TIMBER STACKING ASSEMBLY

[76] Inventors: Roy R. Pryor; Harold A. Pryor, both of P.O. Box 26, Woodville, Tex. 75979

[21] Appl. No.: 763,726

[22] Filed: Jan. 31, 1977

Related U.S. Application Data

[63] Continuation-in-part of Ser. No. 747,553, Dec. 6, 1976.

[51] Int. Cl.² .............................................. B65G 57/28
[52] U.S. Cl. .................................... 214/6 C; 198/413; 271/150
[58] Field of Search ............... 214/6 C; 198/411, 412, 198/413, 746; 271/3.1, 149, 150

[56] References Cited

U.S. PATENT DOCUMENTS

| 2,508,698 | 5/1950 | Von Beren | 214/6 C |
| 3,050,198 | 8/1962 | Schmunk et al. | 214/6 C |

*Primary Examiner*—Frank E. Werner
*Assistant Examiner*—Ross Weaver
*Attorney, Agent, or Firm*—Bard, Springs, Jackson & Groves

[57] ABSTRACT

A timber stacking assembly having at least one elongated lifting arm, means for moving said lifting arm from a first position to a second position, a stacking foot element associated with said lifting arm adjacent one end thereof, means for pivotally mounting said stacking foot element with respect to said lifting arm, and latching means associated with said stacking foot element for locking said stacking foot element against pivoting movement when said lifting arm is in said first position and for unlocking said stacking foot element for pivoting movement when said lifting arm is in said second position.

6 Claims, 5 Drawing Figures

TIMBER STACKING ASSEMBLY

RELATED PATENT APPLICATION

This application is a continuation-in-part of our prior copending U.S. Patent application Ser. No. 747,553, filed Dec. 6, 1976.

BACKGROUND OF THE INVENTION

This invention relates to an improved timber stacking assembly. More particularly, the invention is directed to an improved stop mechanism for the lifting arms of a timber stacker.

There is depicted and described in our prior copending U.S. patent application Ser. No. 747,553, filed Dec. 6, 1976, an improved sawmill apparatus wherein one of the components thereof comprises a timber stacker. Reference may be had to the aforesaid U.S. patent application for details of the sawmill apparatus and the disclosure of said patent is considered incorporated herein for all intents and purposes.

The timber stacker of the aforementioned patent application is specifically illustrated in FIGS. 26–28 and is described in detail therein as to mode of operation and construction. The essential features of the therein described timber stacker comprise at least one lifting arm that is movable between a first generally horizontal position to a second generally vertical position. The lifting arm includes a stop member indicated at 166 for holding the timbers in alignment on the lifting arm as the arm is moved into its upright position. After the timbers have been stacked vertically, the lifting arm is returned to its horizontal position for receipt thereon of a second row of timbers.

Use of the timber stacker of the aforesaid patent application has revealed that under ideal operating conditions, it will load and stack timbers with reasonable effectiveness. Furthermore it possesses the significant advantage that it is much simpler in construction and is more efficient to use than the more conventional timber stackers heretofore known.

On the other hand, the timber stacker of our aforesaid U.S. patent application has been found subject to certain limitations. Thus, the timber stacker mechanism is effective in aligning the timbers onto the arm thereof. The stop member is effective to hold the timbers on the lifting arm in its path of travel to the vertical. However, certain problems have been encountered as the lifting arm is moved from the vertical position and back to the horizontal. These problems have been attributed mainly to the presence of the stop member 166. It has been found, for example, that upon occasion, the stop member will engage the lower timber of the stack as the lifting arm is returned to the horizontal position for reloading. Such engagement of the stop member with the lowermost timber of the stack has caused this lowermost timber to be moved, thereby producing wobbling and instability in the timber stack. Upon occasion, the stop member has caused the erect timber stack to topple over, thus of course, effectively defeating the intended purpose of the timber stacking assembly. Even if the timber stack does not topple over, any slight wobbling of the stack is undesirable since any instability in the timber stack moves these timbers out of stacked alignment one with the other. Furthermore, if one stack of timbers is caused to wobble or tumber over, this in turn wobbles or tumbles over the next adjacent timber stack, and thus instabilities are produced in a domino-like fashion.

It will be readily apparent from a consideration of the teachings hereinafter set forth that a timber stacker is provided and which is of improved construction over that depicted in our prior application. Basically, the herein disclosed timber stacker is of identical construction as described in our prior patent application except for the details of the stop member on the lifting arm, hereinafter referred to as the stacking foot element. Thus, the stacking foot element of the present takes the place of the stop member of our prior application, and provides the timber stacker of the present invention with improved operational modes absent from the prior timber stacker assembly.

More particularly, the timber stacker of U.S. patent application Ser. No. 747,553, includes at least one lifting arm that has provided at one end thereof a stationarily mounted stop member. This stop member provides an abutment surface for the timbers as they are loaded onto the horizontally positioned arm. As the arm is raised to the vertical, the stop member further provides a base for maintaining the timbers in alignment. The improved stop member or stacking foot element of the present invention functions in a fashion similar as aforesaid, except that the stacking foot element of the present invention also has the capability of pivoting away from contact with the timbers on the return path of the lifting arm from vertical to horizontal. It is this pivoting of the stop member that avoids the problems inherent in the timber stacker of the prior application.

Since the stop member of the prior application is fixed to the lifting arm, the return of the lifting arm from vertical to horizontal causes the stop member to bump or engage the lowermost timber of the stack. This limitation is overcome by the stacking foot element of the herein described invention by virtue of the fact that as the stacking foot element comes into contact with the lowermost timber of the stack it is caused to pivot away from engagement with the timber, and thereby freely passing thereunder without bumping the timber or causing movement thereof. Thus, the limitations of the prior application are overcome with the present invention.

SUMMARY OF THE INVENTION

In the preferred form of the present invention, a novel timber stacker is provided which is basically comprised of at least one elongated lifting arm and including means for raising the arm from a horizontal position to a vertical position for the purpose of depositing the timbers onto a pair of lifting pads. The lifting arm includes a pivotally mounted stacking foot element or stop member, and associated therewith is means for locking the stacking foot element in place when the lifting arm is in the horizontal position and for unlocking the stacking foot element when the lifting arm reaches the vertical position. Thus, the stacking foot element is unlocked for pivotal movement once the timbers are placed on the lifting pads. This allows the stacking foot element to pivot beneath the timbers as the lifting arm is returned from its vertical position to the horizontal position.

As will hereinafter be apparent, mounting the stacking foot element for pivoting movement is accomplished by means of a pivoted linkage system including a pair of first and second counterweights. More important, however, this linkage system will cause the stacking foot element to lock in a first position as the lifting arm moves from the horizontal to the vertical, but will unlock the stacking foot element for pivoting movement once the lifting arm is set in the vertical and the timbers transferred to the lifting pads.

It will be seen in the detailed description hereinafter provided that the stacking foot element will only be caused to be pivoted when the weight of the timber is transferred from the stacking foot element to the lifting pads. Thus, the particular construction of the latching means and the linkage system coact with the timber load to lock the stacking foot element against movement when the stacking foot element supports the load of the timbers on the lifting arm, and unlocks the stacking foot element for swinging movement when the timber load is transferred to the lifting pads.

Accordingly, it is a feature of the present invention to provide a novel device for mechanically stacking timbers.

It is a further feature of the present invention to provide an improved assembly for the stacking of timbers, which assembly avoids the disadvantages possessed by prior stacker assemblies.

It is also a feature of the present invention to provide the lifting arm of a timber stacking assembly with a movable stop member or stacking foot mechanism which is free to swing out of engagement with the timber stack as the lifting arm is returned to the horizontal or start position.

It is still a further feature of the herein disclosed and described invention to provide automatic means whereby the pivoted stacking foot element of the improved timber stacking lifting arm will lock and unlock for swinging movement in response to the position of the lifting arm and the transfer of weight from the stacking foot element.

These and other features and advantages of the present invention will become apparent from the following detailed description wherein reference is made to the figures of the accompanying drawings.

IN THE DRAWINGS

DETAILED DESCRIPTION

As hereinbefore explained, the present invention is directed to a sawmill of the type depicted in our prior U.S. patent application Ser. No. 747,553, and reference may be had thereto for details thereof. Thus, the disclosure of the prior application is considered to be incorporated herein for all intents and purposes and with reference to a full understanding of the improvement of the present invention. Thus, it should be apparent that the figures of the accompanying drawings parallel FIGS. 26–28 of the prior application but for the addition thereto of the improved stacking foot element intended to replace the stationary stop member 166 shown therein. The operation of the improved timber stacker of the present invention and its environment are otherwise identical with that of the prior application. However, for purposes of clarity much of the detail of the prior application has been omitted herein. Thus, the prior application should be referred to for a complete understanding of the overall sawmill operation and for the location and co-action of the improved timber stacker disclosed herein. Furthermore, reference should be made to the prior application for the details of the actuating means for lifting the arms which is depicted in FIGS. 29–31, and for the illustration and operation of the lifting pads which is otherwise shown in FIG. 18 thereof. Thus, the following detailed description will be limited primarily to the area of improvement over the timber stacker of the prior application.

Figure 1:
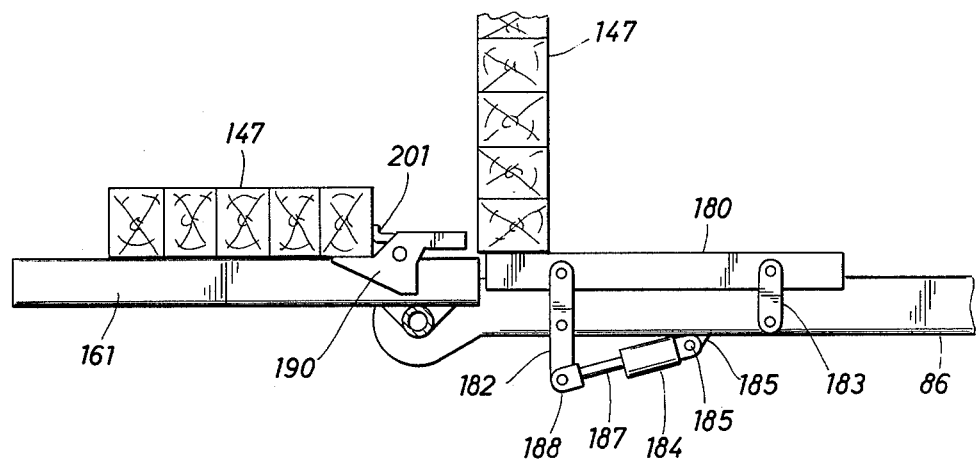
FIG. 1 is a pictorial representation of the timber stacking assembly of the present invention with the lifting arm being illustrated in the horizontal or loading position.
Figure 2:
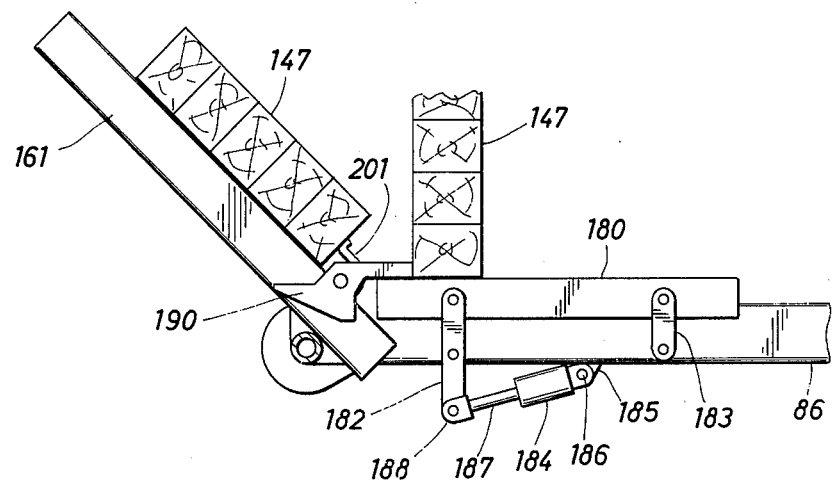
FIG. 2 is a different pictorial representation of the assembly depicted in FIG. 1 and showing the lifting arm in a position mid-way between horizontal and vertical.
Figure 3:
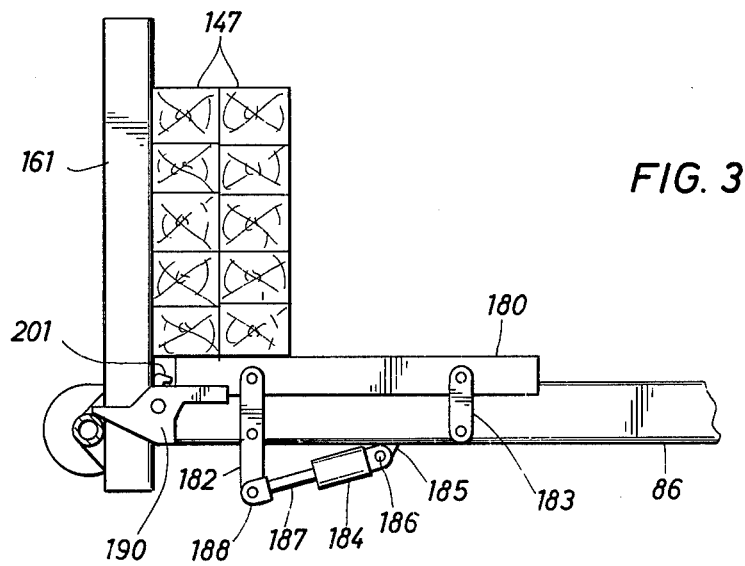
FIG. 3 is another pictorial representation of the assembly depicted in FIG. 1 and showing the lifting arm in the vertical position.

Referring now to FIGS. 1–3, it may be seen that the lifting arm 161 is provided with a suitable stack pusher member 190 pivotally mounted thereon. In addition, a lifting pad 180 is appropriately mounted adjacent the inner surface of the chain assembly 86. More particularly, the lifting pad 180 may be seen to be pivotally supported with respect to the chain assembly 86 by means of a shorter pivot arm 183 at one end of the lifting pad 180 and a longer pivot arm 182 at its other end. In addition, a pneumatic cylinder 184 is interconnected by a pin 186 rotatably linked to a bracket 185 mounted on or adjacent the lower surface of the chain assembly 86 and having its piston rod 187 connected to the lower end of the longer pivot arm 182 by a clevis and pin assembly 188. Accordingly, when the piston rod 187 is extended from the cylinder 184, the lifting pad 180 will be elevated by the pivot arms 182-183 above the upper surface of the chain assembly 86, and when the piston rod 187 is retracted, the lifting pad 180 is retracted below the upper surface of the chain assembly 86.

It will be noted that when the arm 161 is elevated to a vertical position, the piston rod 187 is extended from the cylinder 184 to elevate the pad 180 above the chain assembly 86, and the stack of timbers 147 carried thereon may then be deposited on the lifting pad 180.

When another five timers have been received onto the lifting arm 161 and when the arm 161 is again elevated to a vertical position, this additional stack of timbers will again be set down on the elevated lifting pad 180. To prevent the second stack of timbers from interfering with the first deposited stack of timbers 147, it will be noted, that the rotatable stack pusher 190, which is rotatable freely but balanced to keep its level position as shown, will be moved into abutting engagement with the first stack of timbers 147 to push them forward along the lifting pad 180. Each time the lifting arm is elevated to a vertical position, the stack pusher 190 will therefore be brought into abutting engagement with the preceding stack or stacks of timbers to shove them out of the way and to thereby prevent them from being toppled over by the arrival of the subsequent stack of timbers 147.

With reference now to FIG. 1 and to the improved stacking foot element 201 of the present invention it should be apparent that this element 201 is intended as a replacement for the otherwise stationary stop member 166 of the prior application and in fact is located in generally the same position with respect to lifting arm 161 as the stationary stop member 166. Thus, the herein depicted and described stacking foot element 201 performs substantially the same function and in substantially the same fashion as the stationary stop member of the prior application as the lifting arm 161 moves from its horizontal to its vertical position. But this is as far as the parallel can be drawn. For upon movement of the lifting arm 161 from vertical back to horizontal, the stacking foot element 201 functions in a totally different fashion from the stop member set forth in the prior application, as will be apparent from the following description.

The assembly including the stacking foot element 201 will be seen to comprise a frame 200 including a pair of parallel and spaced apart plate members. The frame with its plate members is received within the lifting arm 201 and is seen to be located adjacent one end thereof. The frame 200 may be suitably affixed within lifting arm 161 by welding or with the aid of conventional attachment elements such as stud bolts etc. The upper surface of the lifting arm 161 is slotted along the length of the plates to provide for the extension of stacking foot element 201 therethrough. Thus, the stacking foot element is free to swing within and without the lifting arm 161 by virtue of its open and slotted upper surface.

The pivoted and swinging movement of the stacking foot element 201 is provided by a pivot pin 206 which is mounted between the plates. The stacking foot element will be seen to include a timber locating surface 211 at one end and a dog-leg like extension member 212. The lower end of this dog-leg extension is associated with pivot pin 206 for swinging movement thereabouts. The dog-leg extension member 212 of the stacking foot element further includes a counterweight 202 carried thereby. It should be apparent that the whole unit including timber bearing surface 211, the dog-leg extension member 212, and the counterweight 202, constitute the stacking foot element 201 and are free to swing or pivot about pivot pin 206 as a unit.

Figure 4:
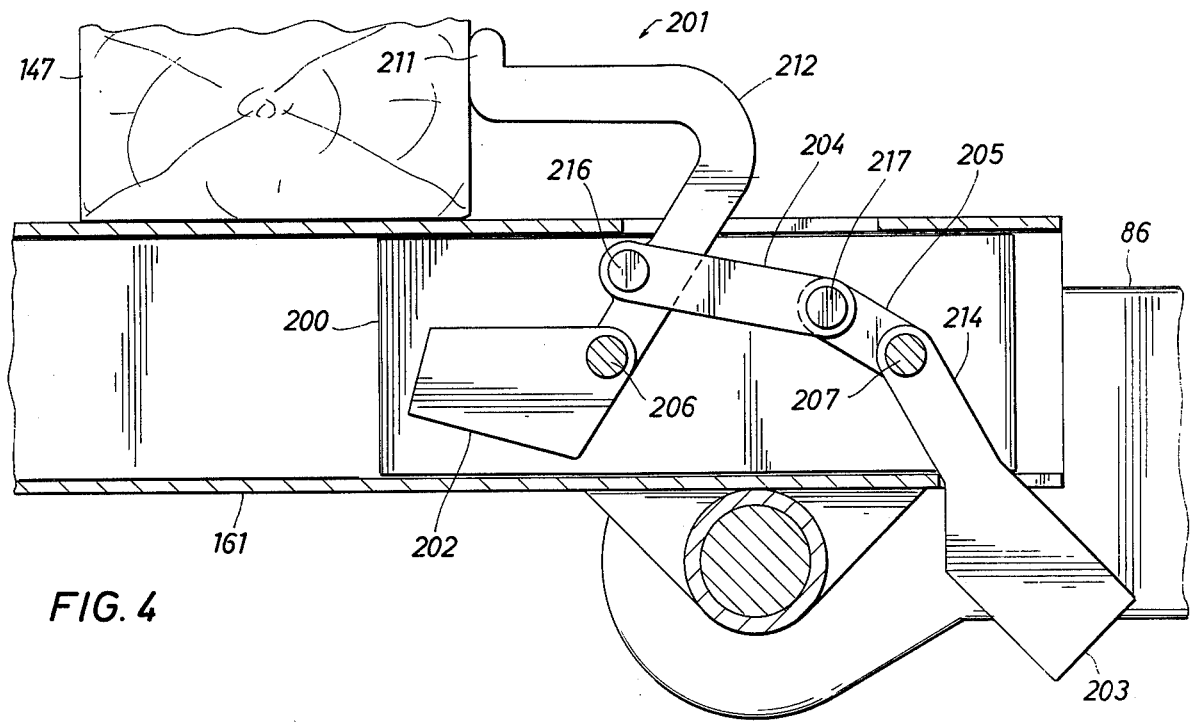
FIG. 4 is a pictorial representation of the details of the stacking foot element and assembly and showing the position of the various operative elements when the lifting arm is in the horizontal position.
Figure 5:
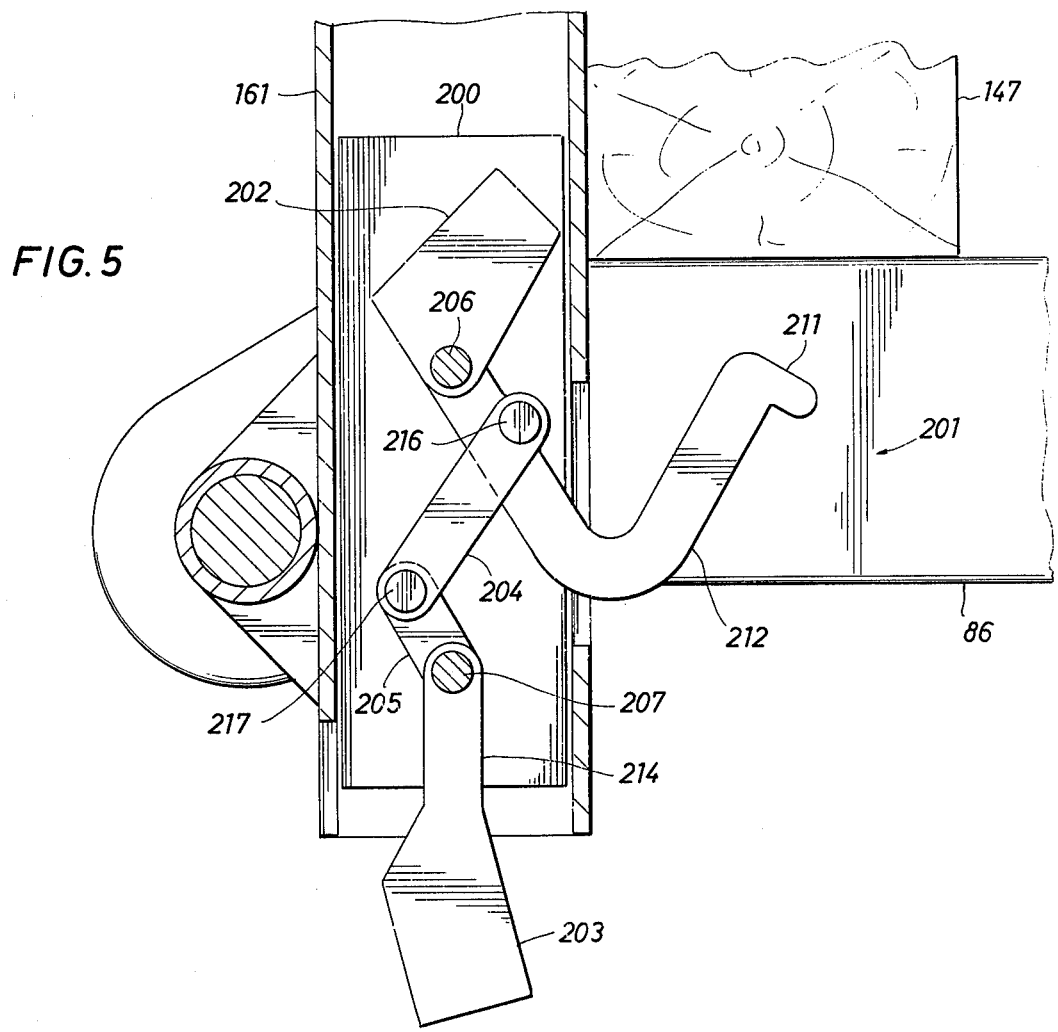
FIG. 5 is a pictorial representation similar to FIG. 4 but with the lifting arm in the vertical position.

A second pivot pin 207 will be seen to be provided in spaced relationship to pivot pin 206, and both of the pivot pins 206 and 207 are arranged between the plates along the same center line. Arranged for swinging movement about pivot pin 207 is a second latching counterweight 203 which includes an upwardly extending arm 214. It is this second counterweight 203 that latches or unlatches the stacking foot element 201 for swinging movement about pivot pin 206. In general, counterweight 203 is free to pivotally move about pivot pin 207 from a first generally offset position as seen in FIG. 4, when the lifting arm 161 is horizontal, to a second generally aligned position as seen in FIG. 5 when the lifting arm 161 is vertical. When the counterweight 203 is in the offset position, the stacking foot element 201 is locked against swinging movement and the bearing surface 211 is maintained in abutting relationship to the timber. In the aligned position, however, the stacking foot element 201 is unlocked for swinging or pivoting movement about pivot pin 206.

The cooperation and co-action between the stacking foot element 201 and the second locking counterweight 203 is provided by a linkage assembly constituting first and second arm sections 204 and 205. The linkage assembly further includes two pivot pins 216 and 217 each of which is associated with one of the second counterweight 203 and the stacking foot element 201. Thus, pivot pin 216 is associated with one end of arm 204 and with the dog-leg extension 212 of the stacking foot element. On the other hand, pivot pin 217 is associated with the end of each of arms 204, 205 and with arm 214 of the locking or latching counterweight 203. A free swinging arrangement is thereby provided for the thusly provided elements by virtue of the four pivot pins 206, 207, 216 and 217.

In the operation of the stacking foot assembly above described, timbers 147 are loaded onto lifting arm 161 as shown in FIG. 1 and with the lifting arm in the horizontal position. The timbers 147 are forced into abutting engagement one with the other and the last timber of the row abuts the bearing surface 211 of the stacking foot element. With the lifting arm 161 in the horizontal position, counterweight 203 will assume its offset position as shown in FIG. 4. As long as there is any pressure exerted upon the bearing surface 211 by the timbers, counterweight 203 will maintain its offset position since the pivot pin 217 is located above the center line of the pivot pins 206 and 207. This effectively locks the stacking foot element 201 against swinging movement about pivot pin 206. The lifting mechanism for the lifting arm 161 is then actuated to swing the lifting arm upwardly towards the vertical as shown in FIG. 2. In this midway position, the weight of the timbers bears against surface 211, and of course, the counterweight 203 maintains its offset position thus keeping the stacking foot element stationary. Continued movement of the lifting arm 161 brings it to the vertical as shown in FIG. 3, whereupon the stack of timbers is deposited on the elevated pad 180. Accordingly, the weight of the timbers 147 is transferred from the bearing surface 211 of the stacking foot element 201 and onto the pad 180. This transfer of weight causes the counterweight 203 to swing to the right and into its second or aligned position as is seen in FIG. 5. The movement of the counterweight 203 into its second position drops the pivot pin 217 below the center line of the pins 206 and 207, and thereby allows the stacking foot element to retract into the lifting arm 161 between the frame plates. Accordingly, the stacking foot element 201 is freed for swinging movement about pivot pin 206 and is retractable within and with respect to lifting arm 161. The lifting mechanism for the lifting arm 161 is then actuated to return the lifting arm 161 from the vertical to the horizontal. As the lifting arm 161 moves back to the left as shown in FIG. 5, the lowermost timber of the stack will be seen to lie in the path of travel of the surface 211 of the stacking foot element 201. Ordinarily, this lower timber would act in the fashion of an obstruction to travel were it not for the fact that the stacking foot element is free to pivot about pin 206. Thus, as the lifting arm 161 is lowered, the stacking foot element 201 simply pivots about pivot pin 206 and glides beneath the lowermost timber of the stack, and without any obstruction between surface 211 and the lower timber. If the surface 211 happens to contact the lower timber of the stack, the stacking foot element yields to the timber. In yielding, the surface 211 of the stacking foot element is simply pushed beneath and out of the path of the lower timber of the stack. Thus, there is no tendency for the stacking foot element 201 to bump the lower timber of the stack to thereby wobble or topple the timber stack. This pivoting and yielding movement of the stacking foot element insures that the timbers will be maintained in their thusly deposited stacked relationship on the pad 180, and eliminates effectively the toppling limitations that were encountered with the stationary stop member of the prior application. It should be apparent from the above that as the lifting arm is lowered to the horizontal again, that the counterweight 203 will pivot about pin 207 from its aligned position and back to the offset position. This movement of counterweight 203 will in turn extend the stacking foot element 201 upwardly again to bring surface 211 thereof back to its timber engaging position. Accordingly, it will be obvious that the stacking foot element 201 is provided to be both extendable into a timber engaging position and retractable from engagement with the timber. The extendable position is provided when the lifting arm 161 is moved from the horizontal to the vertical. The retractable position is assumed as the lifting arm is moved again from the vertical to the horizontal.

It will be apparent from the foregoing that many other variations and modifications may be made in the structures described herein without substantially departing from the basic concept of the present invention. Accordingly, it should be clearly understood that the form of the invention described herein and depicted in the accompanying drawings are exemplary only and are not intended as limitations in the scope of the present invention.

What is claimed is:

1. In a timber stacking assembly having at least one elongated lifting arm and means for moving said lifting arm from a first position to a second position, the improvement in a lifting arm stop mechanism comprising:
    a stacking foot element associated with said lifting arm adjacent one end thereof,
    means for pivotally mounting said stacking foot element with respect to said lifting arm, and
    latching means associated with said stacking foot element for locking said stacking foot element against pivoting movement when said lifting arm is in said first position and for unlocking said stacking foot element for pivoting movement when said lifting arm is in said second position, said latching means including a first counterweight connected to said stacking foot element, a second counterweight, and linkage means connected between said stacking foot element and said second counterweight.

2. The assembly described in claim 1, and including means for pivotally mounting said second counterweight with respect to said lifting arm.

3. The assembly described in claim 2 and wherein there is provided means for pivotally mounting said linkage means with respect to both said stacking foot element and said second counterweight.

4. An apparatus for stacking timber and the like comprising:
    at least one elongated lifting arm,
    means for moving said lifting arm from a first position to a second position,
    a stacking foot element associated with said lifting arm adjacent one end thereof,
    means for pivotally mounting said stacking foot element with respect to said lifting arm, and
    latching means associated with said stacking foot element for locking said stacking foot element against pivoting movement when said lifting arm is in said first position, and for unlocking said stacking foot element for pivoting movement when said lifting arm is in said second position, said latching means including a first counterweight connected to said stacking foot element, a second counterweight, and linkge means connected between said stacking foot element and said second counterweight.

5. The assembly described in claim 4, and including means for pivotally mounting said second counterweight with respect to said lifting arm.

6. The assembly described in claim 5, and wherein there is provided means for pivotally mounting said linkage means with respect to both said stacking foot element and said second counterweight.

* * * * *